OR 3,980,399

United States

Howden 3,980,399

Sept. 14, 1976

[54] ASPHERIC OPTICAL ELEMENTS

[75] Inventor: Harry Howden, Salfords, near Redhill, England

[73] Assignee: U.S. Philips Corporation, New York, N.Y.

[22] Filed: Aug. 11, 1975

[21] Appl. No.: 603,281

[30] Foreign Application Priority Data
Nov. 25, 1971 United Kingdom............... 54807/71

[52] U.S. Cl............................ 350/189; 350/175 NG
[51] Int. Cl.² ................................................ G02B 3/04
[58] Field of Search............ 350/189, 175 NG; 264/1

[56] References Cited
UNITED STATES PATENTS

| | | | |
|---|---|---|---|
| 2,868,075 | 1/1959 | DeAngelis | 350/175 NG |
| 3,064,401 | 11/1962 | Mooney | 350/189 |
| 3,210,894 | 10/1965 | Bentley et al. | 350/189 |
| 3,486,825 | 12/1969 | Howland | 350/189 |

*Primary Examiner*—John K. Corbin
*Assistant Examiner*—Conrad Clark
*Attorney, Agent, or Firm*—Frank R. Trifari; George B. Berka

[57] ABSTRACT

An optical element comprising a glass substrate on which a plastics material defining an optical surface is moulded. Shrinkage of the plastics material during curing is compensated for by allowing the glass substrate to deform due to the shrinkage, and optically working flat the outer surface of the glass substrate so that when the element is released from mould this outer surface will restore and take up a curvature which is equal to the amount of curvature lost at the moulded optical surface due to the shrinkage.

Figure 1:
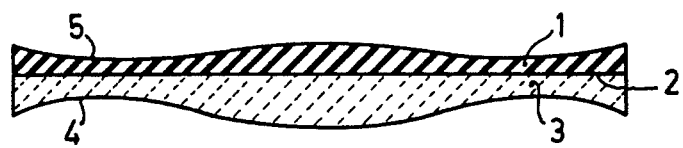

FIG. 1 is best suited for early publication purposes.

1 Claim, 4 Drawing Figures

ASPHERIC OPTICAL ELEMENTS

This is a division, of application Ser. No. 306,344, filed Nov. 13, 1972 now U.S. Pat. No. 3,917,766.

This invention relates to the manufacture of aspheric light-transmissive optical elements using a replication process in which at least that portion of the element which defines an optical surface thereof is moulded from a plastic material.

In the production of such optical elements there exists the problem of forming the optical surface to the desired accuracy due to the shrinkage of the plastics material when it is cast.

One solution to this problem is given by Starkie in an article on Pages 107–109 of "Modern Plastics," October 1947, in which there is described the manufacture of an aspheric optical element, such as a Schmitt corrector plate, by what is referred to as the "surface finishing process". In this process a plastics material is cast in an optically worked mould which conforms to a desired shape of an optical surface. This produces a moulded preform which due to the shrinkage of the plastics material when it is cast has an optical surface which departs very slightly from the exact shape of the interior of the mould. Using the same mould a thin film of the same plastics material as used for the preform is then cast on the surface of the preform. This film is relatively thin compared with the bulk of the preform, so that its shrinkage on casting is small and the result is that an optical element is obtained whose shape conforms fairly accurately to the shape of the interior of the mould. Because the same material is used for the preform and the film, the interface between the two need not affect the optical properties of the element, the refractive index at each side of the interface being the same. However, with this process the shrinkage of the film during moulding means that the optical element cannot conform exactly to the desired optical shape, but the tolerance involved is acceptable for some applications.

In another type of replication process which is known from U.K. Pat. Specification No. 679426, a moulded preform is dispensed with and a surface coating of plastics material is moulded in accordance with a desired aspheric shape on the surface of a substrate. In this instance, the surface coating is very thin compared with the thickness of the substrate so that, as in the previous process, the shrinkage on casting is small. One way to achieve greater accuracy with this latter type of process is to compensate for shrinkage of the plastics material during casting by using a mould having an enlarged or exaggerated aspheric surface such that the quantity of plastics material needed in the mould to fill it initially will shrink on casting to form the required aspheric surface. This way of achieving greater accuracy is essentially on a trial and error basis and involves comparing successively moulded elements with an optically worked master, the mould being fractionally enlarged after each comparison until the desired accuracy is achieved. Another way to achieve greater accuracy with this latter type of process is described in co-pending U.K. Pat. Application No. 37354/71 (PHB 32181) and involves compensating for shrinkage of the plastics material during casting by using a material whose refractive index is greater by an appropriate amount, than that of a glass master in respect of which the aspheric surface of the mould is complementary, to offset the reduced optical thickness caused by the shrinkage of the plastics material.

The present invention proposes a further way of achieving greater accuracy with said latter type of process.

According to the present invention, a method of manufacturing an aspheric light-transmissive optical element is characterized in supporting a light-transmissive substrate with one surface in proximity with a mould surface that has a profile which is the negative of a required optical profile, filling the region between said surfaces with a light-transmissive adhesive plastics material having, when cast, approximately the same refractive index as the substrate, causing the plastics material to cast into a moulded layer with it adhered to both said surfaces and with the substrate in a state of elastic deformation due to shrinkage of the plastics material on casting, optically working flat the other, outer, surface of the substrate, and releasing the substrate with the mould layer adhered thereto from the mould surface, said substrate and layer together forming said optical element.

With the method of manufacturing according to the invention, the step of optically working flat the outer surface of the substrate results in this outer surface assuming, when the substrate is restored from its elastic deformation when it is released with the moulded layer from the mould surface, a profile which represents a curvature equal to the amount of curvature lost at the aspheric surface of the moulded layer due to shrinkage of the plastics material on casting. It will by appreciated that this loss of curvature only becomes apparent when the substrate is restored from its elastic deformation by separating the aspheric surface of the moulded layer from the mould surface.

In carrying out the invention the use of a thermosetting synthetic material, such as an epoxy resin or a polyester resin, for the moulded layer is preferred because such materials are relatively hard when cast and thus give a durable product. The substrate may also be a moulded preform of such materials, but the use of a glass substrate is preferred because glass blanks with flat surfaces are easily and cheaply obtainable and need not be manufactured specially for the purpose. Ideally, the refractive index of the plastics material is the same as that of the substrate, so that the curvature on said outer surface of the substrate compensates exactly for the loss of curvature at the aspheric surface of the moulded layer. However, in practice, approximately the same refractive indices will give a high order of accuracy. For example, for a glass substrate having a refractive index of, say, 1.62, the plastics material may be an epoxy resin having a refractive index of about 1.57. This will give an error or deviation of only 1 micron for a moulded layer of 1 mm thickness.

Also, in carrying out the invention, the region between the mould surface and the facing surface of the substrate is preferably bounded by a member on which said substrate is supported and which is displaceable with respect to the mould surface in a direction normal to the substrate to allow deformation of the latter adjacent its edge.

Figure 2:
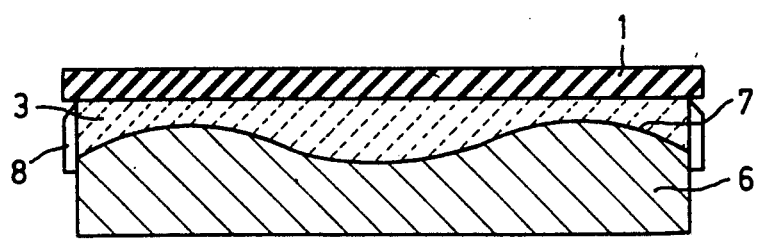
Figure 3:
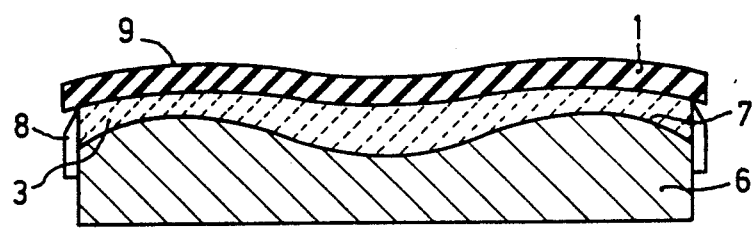
Figure 4:
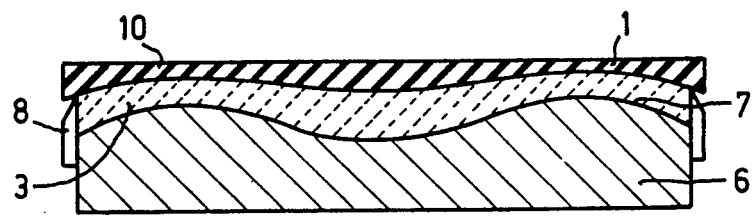

In order that the invention may be more fully understood reference will now be made by way of example, to the accompanying drawing of which:

FIG. 1 shows diagrammatically and not to scale an optical element manufactured in accordance with the invention; and FIGS. 2 to 4 illustrate respective stages in the manufacture of the optical element of FIG. 1.

Referring to the drawing, the optical element shown in FIG. 1 is a Schmidt corrector plate and comprises a circular glass substrate 1 having one surface 2 coated with a moulded layer 3 of an epoxy resin. The outer surface 4 of the layer 3 is aspheric and conforms approximately to the wellknown Schmidt corrector plate profile. The outer surface 5 of the glass substrate 1 has a curvature equal to the amount of curvature which is deficient at the layer surface 4 due to shrinkage of the epoxy resin on casting this layer using a mould surface which is complementary to the full Schmidt corrector plate profile. The glass substrate 1 typically has a diameter of 12 cm, a thickness of 0.6 cm and a refractive index of 1.62. Suitably, the layer 3 is moulded from bisphenol A epoxy resin having an epoxy equivalent of about 5 and an hydroxyalkylated polyamine hardener which produces a cured resin having a refractive index of 1.57. The difference in thickness between the thickest and thinnest parts of the layer 3 is typically less than 0.02 inches.

The manufacture, in accordance with the invention, of the corrector plate of FIG. 1 will now be considered with reference to FIGS. 2 to 4. A glass mould 6 has a mould surface 7 that has a profile which is the negative (i.e. the complement) of the required optical profile for the corrector plate. The mould surface 7 is given the required profile by normmal optical working techniques and this profile is complementary to the aspheric profile of a glass master of known refractive index (i.e. 1.57 — the same as the resin layer 3) whose optical properties the corrector plate to be manufactured has to conform to. The accuracy of the mould surface profile is checked by comparison with the glass master by interference fringe methods.

The mould surface 7 is then processed to enable the epoxy resin mixture which is to form the layer 3 to be released from it without undue difficulty after the resin has cured. To this end the surface 7 is washed in a mixture of warm water and detergent, cleaned with precipitated chalk, washed with deionised water, rinsed in isopropyl alcohol and then cleaned by ion bombardment in a vacuum chamber, and finally coated with silicone release agent and polished. The surface 2 of the glass substrate 1 is similarly treated to enable the epoxy resin mixture to adhere to it as well, but is not coated with release agent.

The glass substrate 1 is then placed in close proximity to the glass mould 6 in the configuration shown in FIG. 2, the spacing between the surface 2 and 7 being typically 0,05 to 0,12 cm at the narrowest points. Accuracy of this spacing is facilitated by means of a sleeve 8 on which the glass substrate 1 is supported and which is free to slide, under the influence of an applied force, with respect to the glass mould 6. The space 9 thus formed between the surfaces 2 and 7 is then filled with the mixture of epoxy resin and hardener. It is important that air bubbles are not trapped in the resin mixture while this is being done and, to prevent this, this step is carried out in vacuum chamber. The resin mixture is then left to cure at room temperature to form the moulded layer 3. Since the resin mixture shrinks on curing, and also adheres to both the surfaces 2 and 7 sufficiently well to prevent the bond being broken under the pressure exerted in a direction normal to the glass substrate 1 due to the shrinkage, the glass substrate 1 assumes a state of elastic deformation as illustrated in FIG. 3. The upper surface 9 of the glass substrate 1 now has a profile which is in direct proportion to the shrinkage factor of the resin mixture and the profile of the mould surface 7. This upper surface 9 is now ground and polished flat to the surface 10 (5-FIG. 1) as illustrated in FIG. 4, after which the glass substrate 1 with the layer 3 adhered to its surface 2 is released from the mould surface 7 by the discrete application of a force specifically higher than the force of adhesion between the cured resin mixture and the mould surface 7. On release, the glass substrate 1 restores from its elastic deformation, thereby causing the aspheric surface 4 to lose a small amount of curvature as it is "straightened". However, this loss of curvature is compensated for by the curvature which the worked (previously flat) surface 10 (5) assumes when the glass substrate 1 restores from its elastic deformation.

What we claim is:

1. An aspheric light-transmissive optical element comprising a glass substrate portion having one surface defining an optical curvature and an opposite flat surface, and a portion of a thermosetting plastic material adhered to said flat surface and having substantially the same index of refraction as said substrate portion, said plastic portion defining at its outer surface said optical curvature.

* * * * *